United States Patent [19]

Nishii et al.

[11] Patent Number: 4,887,869
[45] Date of Patent: Dec. 19, 1989

[54] HYDRAULIC BRAKING SYSTEM

[75] Inventors: Michiharu Nishii, Toyota; Genji Mizuno, Toyoake; Yoshihiko Tada, Hazu; Yoshihisa Nomura, Toyota; Masahiko Kato, Nagoya; Kenji Shirai, Mishima; Junichi Tanoue, Susono, all of Japan

[73] Assignee: Aisin Seiki Kabushiki Kaisha, Kariya, Japan

[21] Appl. No.: 259,775

[22] Filed: Oct. 19, 1988

[30] Foreign Application Priority Data

Oct. 19, 1987 [JP] Japan ................................. 62-263547

[51] Int. Cl.$^4$ .............................................. B60T 8/44
[52] U.S. Cl. ..................................... 303/114; 60/548; 303/113
[58] Field of Search ....................... 60/545, 547.1, 548; 303/113, 114, 115, 116, 117, 119

[56] References Cited

U.S. PATENT DOCUMENTS 4,643,488  2/1987  Reinartz .............................. 303/114
4,660,898  4/1987  Steffes ................................. 303/114

Primary Examiner—Duane A. Reger
Attorney, Agent, or Firm—Burns, Doane, Swecker & Mathis

[57] ABSTRACT

A pair of spaced apart large-diameter and small-diameter lands between which a fluid chamber is defined are formed on a second piston in a tandem cylinder to which an anti-skid device is added. Booster pressure is applied to the fluid chamber to act on the large-diameter land in a manner fluidly locking the second piston against movement despite a reduction in pressure in the first and second pressure chambers during operation of the anti-skid device. As a result, the movement of the brake pedal in the normal direction of depression is prevented when the anti-skid devices operates.

5 Claims, 1 Drawing Sheet

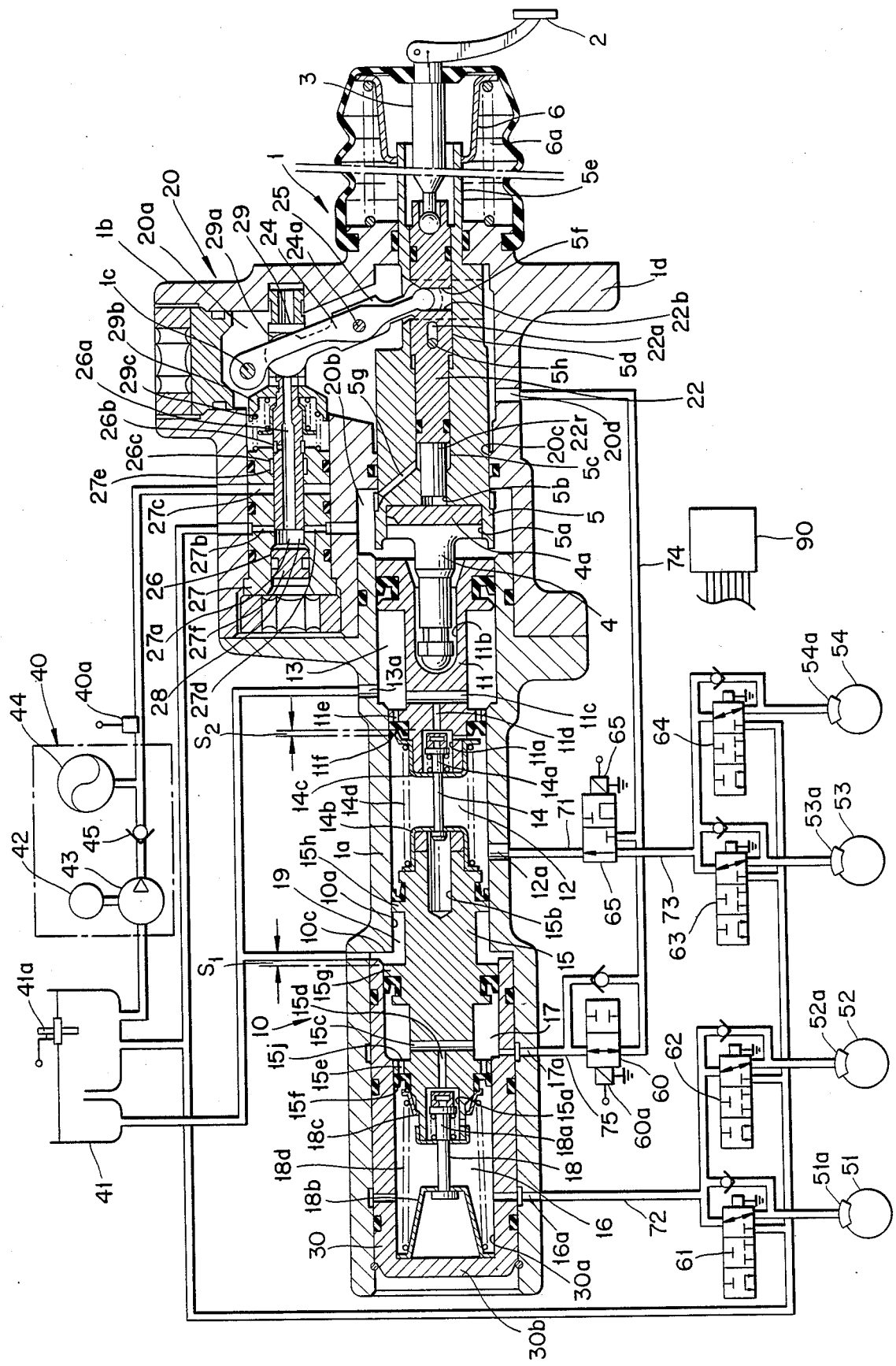

HYDRAULIC BRAKING SYSTEM

BACKGROUND OF THE INVENTION

1. Field of the Invention

The present invention relates to a hydraulic braking system and in particular to a hydraulic braking system in which a tandem master cylinder and an anti-skid device are combined.

2. Description of the Prior Art

Generally speaking, in a hydraulic braking system of that kind, first and second pressure chambers arranged in a tandem master cylinder are in fluid communication with first and second sets of wheel cylinders, respectively. In order to define both chambers in a bore formed in a body of the tandem master cylinder, a first piston and a second piston, both of which are slidably fitted in the bore, are operatively connected with each other in series so as to be moved by a brake pedal. Since the pressures in both chambers are decreased during the actuation of an anti-skid device, the brake pedal is undesirably subject to move in the direction of the depression.

For preventing such a drawback, U.S. Pat. No. 4,729,610 discloses a sleeve which is slidably mounted on a first piston so as to be brought into engagement with a pedal operated booster piston. However, with a view to preventing the generation of noise and/or shock upon the above-mentioned engagement, and additional means has to be provided. That is to say, an annular gap in which fluid is filled is defined between the sleeve and a bore. During movement of the sleeve towards the booster piston, fluid is discharged from the annular gap through an orifice formed radially in the sleeve. Thus, the movement of the sleeve is decelerated with the result that an abrupt engagement of the sleeve with the boost piston is avoided.

However, it is cumbersome to provide such additional means including the annular gap. Also, due to such additional means, the tandem master cylinder becomes complex in construction. Further, upon loading of the orifice, the additional means or deaccelerating means is brought into malfunction.

SUMMARY OF THE INVENTION

It is, therefore, a principal object of the present invention to provide a hydraulic braking system without the aforementioned drawbacks.

Another object of the present invention is to provide a hydraulic braking system in which means is provided in the tandem master cylinder so as to prevent the movement of a pedal in the direction of depression during the anti-skid operation.

To achieve the objects and in accordance with the purposes of the present invention, a hydraulic braking system is comprised of (1) a tandem master cylinder having a bore with opposing open and closed ends, a brake pedal, a first piston slidably fitted in the bore so as to define a first pressure chamber and a first fluid chamber therein and operatively connected to the pedal through the opening, a second piston slidably fitted in the bore so as to define a second pressure chamber adjacent to the first pressure chamber and a second fluid chamber and operatively connected to the first piston, a first circuit through which fluid is supplied from the first pressure chamber to a first set of wheel cylinders, a second circuit through which fluid is supplied from the second pressure chamber to a second set of wheel cylinders, (2) a power source, (3) a hydraulic regulator which regulates the pressure derived from the power source in response to the depression of the pedal and supplying the resulting pressure to the second fluid chamber, (4) an anti-skid device for varying the pressure in the wheel cylinders during a skid condition, and (5) means for fluidly locking said second piston against movement toward said closed end upon a reduction of pressure in said second pressure chamber during operation of said anti-skid device. Preferably, such means comprises a land on the second piston which is acted upon pressure from the hydraulic booster in a direction away from the closed end. As a result, undesired movement of the pedal is prevented without any noise-generating impacts occurring against the second piston.

BRIEF DESCRIPTION OF THE DRAWING

The above and other objects, features and advantages of the present invention will become apparent and more readily appreciated from the following detailed description a preferred embodiment of the present invention, taken in connection with the accompanying drawing, in which a single FIGURE is a longitudinal sectional view through a hydraulic braking system according to the present invention.

DETAILED DESCRIPTION OF A PREFERRED EMBODIMENTS OF THE INVENTION

A hydraulic braking system 1 comprises a tandem master cylinder 10 and a hydraulic booster 20. A depressing force applied on a brake pedal 2 is transmitted as a braking force to an input rod 3. In response to this braking force, hydraulic pressure introduced from a power source 40 or a reservoir 41 is appropriately regulated and applied to wheel brake cylinders 51a and 52a of front wheels 51 and 52 via a first circuit 72, as well as to wheel brake cylinders 53a, 54a of rear wheels 53 and 54 via a second circuit 71.

The tandem master cylinder 10 includes a housing 1a with a bore 10a. A first piston 11 and a second piston 15 are slidably and fluid-tightly disposed or fitted in the bore 10a. At opposite ends of the first piston 11, there are formed a large-diameter land and a small-diameter land. A right side of the bore 10a is formed into a stepped configuration so as to receive the first piston 11. Between the lands of the first piston 11, a first fluid chamber 13 is defined in the bore 10a, and a first pressure chamber 12 is defined between a left end of the first piston 11 and the second piston 15 in the bore 10a. The first pressure chamber 12 is in fluid communication with the circuit 71 via port 12a, and the first fluid chamber 13 is in fluid communication with a reservoir 41 via port 13a.

The first piston 11 has a pair of holes 11a, 11b extending axially from its opposite ends towards its center, and a hole 11c formed radially and communicating with the hole 11a via a small hole 11d. A check valve is constituted by an axial hole 11e of the first piston 11 and a cup-seal 11f which covers a left end of the hole 11e. A valve member 14a mounted on a right end of a valve rod 14 is slidably received in the hole 11a of the first piston 11 in opposing relation to the small hole 11d. The valve member 14a is restricted from moving towards the second piston 15 by a retainer 14c mounted on the first piston 11.

A return spring 14d is disposed between the retainer 14c and a retainer 14b mounted on a right end of the second piston 15 so as to continually bias the first piston 11 and the second piston 15 away from each other. Thus, the opposite ends of the valve rod 14 are normally in engagement with the respective retainers 14b and 14c. As a consequence, the valve member 14a and the small hole 11d are spaced from each other, so that brake fluid supplied from the reservoir 41 to the fluid chamber 13 via the port 13a occupies the holes 11c, 11d and 11a of the first piston 11. When the first piston 11 is moved towards the second piston 15 against the biasing force of the spring 14d, the cup-seal 11f and the valve member 14a close the holes 11e and 11e, respectively, so that the pressure chamber 12 is closed except for the port 12a. Accordingly, the pressure of the brake fluid is raised in response to such movement of the first piston 11.

In a left end of the bore 10a, there is fixedly mounted a cylinder 30 in which a stepped bore 30a is formed. The second piston 15 is slidably mounted in the bore 30a so as to be positioned between an end wall 30b and the bore 30a and the first piton 11. On opposite ends of the second piston 15, there are formed a pair of small-diameter lands 15h and 15j which are of equal radius. Also, a large-diameter land 15g is formed on the second piston 15 so as to be positioned at a middle position thereof. A second fluid chamber 17 is defined between the large-diameter land 15g and the small-diameter land 15j, and a second pressure chamber 16 is defined between the end wall 30b and the small-diameter land 15h. Also, an adjusting chamber 19 is defined between the large-diameter land 15g and the small-diameter land 15h. Further, the second pressure chamber 16 is in fluid communication with the second circuit 72 via a port 16a, and the second fluid chamber 17 is in fluid communication with a fifth circuit 75 via a port 17a.

Similar to the first piston 11, the second piston 15 has a pair of axial holes 15a, 15b and a radial hole 15c. The hole 15a is in fluid communication with the hole 15c via a hole 15d. The second piston 15 has an axial hole 15e the left end of which is closed by a cup-seal 15f. A valve member 18a which is mounted on a right end of a valve rod 18 is slidably mounted in the hole 15a and is restricted from moving towards the end wall 30b by a retainer 18c. A left end of the valve rod 18 is movably carried on a retainer 18b and is restricted from moving towards the second piston 15. A return spring 18d is disposed between the retainer 18b and the retainer 18c so as to space the second piston 15 from the closed wall 30b. Thus, the valve member 18a is disposed away from the hole 15d under normal conditions. When the hydraulic booster 20, which will be detailed later, supplies pressure into the second fluid chamber 17 via a fourth circuit 74, the fifth circuit 75 and the port 17a, the pressure is transmitted to the second pressure chamber 16 via the hole 15e and holes 15d and 15a. Simultaneously, due to the pressure which urges the large-diameter land 15g of the second piston 15 in the rightward direction, the piston 15 is brought into movement towards the first piston 11. This movement of the second piston 15 is stopped immediately upon engagement thereof with a stepped portion 10c of the bore 10a. Thereafter, due to the area-difference between the large-diameter land 15g and the small-diameter lands 15h, 15j the second piston 15 is held at the resulting position.

Also, while pressure from the hydraulic booster 20 does not reside in the fifth circuit 75, when the first piston 11 is moved towards the second piston 15, the volume of the first pressure chamber 12 is decreased thereby increasing the pressure therein and the second piston 15 is moved against the biasing force of the return spring 18d. Thus, the hole 15d is closed fluid-tightly, thereby increasing the pressure of the brake fluid in the second pressure chamber 16. It should be noted that an axial distance S1 between the stepped portion 10c of the bore 10a and the large-diameter land 15g of the second piston 15 (when the latter is in an initial position) is larger than a distance S2 between the left end of the hole 11d and the valve member 14a. The distance S1 is so set as to enable brake fluid to fill the first circuit 71 and wheel cylinders 53a and 54a upon initial movement of the first piston 11.

Next, the hydraulic booster 20 is described below in connection with a braking force input mechanism.

In a housing 11b joined with the housing 11a, a boost chamber 20a and a low-pressure chamber 20b, both of which are part of the hydraulic booster 20, are defined. A power piston 5 is fluid-tightly and slidably fitted in a bore 20c which is formed between the boost chamber 20a and the lower-pressure chamber 20b, and which is substantially coaxial with the bore 10a. The power piston 5 is provided with a retainer 6 at its end extending towards the brake pedal 2, and a spring 6a is mounted between the retainer 6 and the housing 1b so as to normally bias the power piston 5 towards the brake pedal 2. The power piston 5 has at its middle portion a shoulder which abuts the housing 1b to restrict the extent to which the power piston 5 can slide toward the brake pedal 2.

In the power piston 5, a recess 5a is formed at one end facing the first piston 11, and a stepped bore is formed axially in the center. This stepped bore comprises a small-diameter bore 5b, an intermediate-diameter bore 5c, a large-diameter bore 5d and an opening 5e. Received slidably in the stepped bore are a reaction rod 22r received in the small-diameter bore 5b, and a reaction piston 22. The reaction piston 22 has a small-diameter portion received in the intermediate-diameter bore 5c and a large-diameter portion received in the large-diameter bore 5d. The axial length of the reaction rod 22r is larger than the length of the small-diameter bore 5b of the stepped bore. Formed in the reaction piston 22 are an elongated hole 22a extending coaxially with the axis of the reaction piston 22, and a through-hole 22b extending perpendicular to the elongated hole 22a. A pin 5h fixed onto the power piston 5 is disposed in the elongated hole 22a, to limit the extent to which reaction piston 22 can slide towards the brake pedal 2 with respect to the power piston 5.

The large-diameter portion of the reaction piston 22 is provided with a recess at its end. One end of an input rod 3 is connected to the brake pedal 2, and the other end of the input rod 3 is provided with a spherical head which is inserted in the open end bore 5e of the power piston 5 and received in the recess of the reaction piston 22. The spherical head is engaged with the inner surface of the recess. Formed radially in the power piston 5 is a through-hole 5f which is aligned with the through-hole 22b in the reaction piston when the reaction piston 22 is positioned most closely to the brake pedal 2 and which is larger in diameter than the through-hole 22b.

Between the intermediate-diameter bore 5c and the reaction rod 22r, an annular space is defined due to the difference in axial length between the reaction rod 22r and the small diameter bore 5, and is communicated with the low-pressure chamber 20b through an inclined hole 5g. The large-diameter end portion of the output rod 4 is received in the recess 5a of the power piston 5 with an elastic reaction disk 4a disposed therebetween and is held in the recess 5a by a leaf spring for instance. There normally exists a gap between the reaction disk 4a and the end of the reaction rod 22r. The output rod 4 is disposed in the hole 11b of the first piston 11, and the head of the output rod 4 is in contact with the bottom surface of the hole 11b.

A support lever 24 is pivotally connected at one end to the housing 1b by a pin 1c for pivotal movement within the boost chamber 20a, and a spherical head disposed on the opposite end of the support lever 24 is fitted into the through hole 22b of the reaction piston 22. A control lever 25 is pivotally connected with the support lever 24 by a pin 24a disposed approximately centrally in the control lever, and a first head of the control lever 25 is fitted into the through-hole 5f of the power piston 5. Accordingly, when the reaction piston 22 slides towards the output rod 4 with respect to the power piston 5 which is urged towards the brake pedal 2, a rotating force is exerted on the support lever 24 so as to pivotally move the support lever 24 in the clockwise direction about the pin 1c. At that time, since the first head of the control lever 25 is retained in the through-hole 5f of the power piston 5, the second head of the control lever 25 is rotated in the counterclockwise direction about the pin 24a and hence moves parallel to the sliding direction of the reaction piston 22. As a result, the second head of the control lever 25 is displaced in response to movement of the reaction rod 22r until the latter comes into contact with the reaction disk 4a.

The housing 1b has a spool-valve bore extending substantially in parallel with the power piston 5 and communicating with the boost chamber 20a. A spool valve 28 is fitted into the spool-valve bore 27a. The spool valve 28 has a spool 26 slidably received in the spool bore 27a which is formed in a cylinder 27 substantially in parallel with the power piston 5. One end of the spool bore 27a is fluid-tightly plugged by a closure member 27f. Formed axially in the spool 26 is a through-hole 26a, and formed radially is a hole 26b communicating with the through-hole 26a. One end of the spool 26 is positioned in the boost chamber 20a and is connected to one end of a control rod 29. The other end of the control rod 29 is slidably mounted in a recess formed in the housing 1b. The second head of the control level 25 is fitted into a through-hole 29a radially bored in the control rod 29. Between the cylinder 27 and a retainer 29b formed at one end of the control rod 29, a spring 29c is mounted so as to normally bias the spool 26 towards the control lever 25. The through-hole 26a normally opens into the boost chamber 20a at the junction of the spool 26 and the control rod 29.

When the control lever 25 is in an initial or original position, the through hole 26a of the spool 26 is in fluid communication with both the reservoir 41 and the low-pressure chamber 20b by means of: hole 27b radially bored in the cylinder 27, a hole 27d communicating with the hole 27b via the peripheral groove formed around the outer surface of the cylinder 27, and the corresponding ports formed in the housing 1b. Thus, the boost chamber 20a is also communicated with the reservoir 41 and is filled with the brake fluid under atmospheric pressure. A hole 27c communicating with the power source 40 is formed in the cylinder 27 at a predetermined distance from the hole 27b towards the control rod 29. The hole 27c is normally closed by the peripheral surface of the spool 26. Between the hole 27c and the end of the spool 26 facing the control rod 29, an annular groove 27e is formed on the inner surface of the cylinder 27, and an annular groove 26c is formed on the peripheral surface of the spool 26 is opposing relation to the annular groove 27e.

When the spool 26 is moved towards the closure member 27f in response to movement of the control lever 25, the hole 27b of the cylinder 27 is closed. The hole 27c in turn faces the annular groove 26c of the spool 26, and annular groove 27e faces the annular groove 26c and the hole 26b. Consequently, the hole 27c is communicated with the through-hole 26a. Accordingly, the hydraulic power pressure of the power source 40 is introduced into the boost chamber 20a to increase the hydraulic pressure therein. The reaction force is thereby transmitted to the brake pedal 2 via the reaction piston 22, and at the same time the raised hydraulic pressure is applied to the first piston 11 via the power piston 5. The power piston 5 moves until the pin 5h comes into contact with the elongated hole 2a of the reaction piston 22. Thereby, the relative position of the control lever 25 and the lever 24 becomes the same as previously existed in the initial state. Thus, the control lever 25 is moved in the clockwise direction about the pin 24a to retract the control rod 29 towards the brake pedal 2. The hole 27c of the cylinder 27 is thereby closed, and in turn the hole 27b is communicated with the hole 26a of the spool 26 to lower the hydraulic pressure in the boost chamber 20a so that the power piston 5 is moved towards the brake pedal 2. With this operation performed repeatedly, the hydraulic pressure within the boost chamber 20a is regulated to a predetermined or set boost pressure.

The power source 40 comprises an accumulator 44 for generating a hydraulic power pressure along with a fluid pump 43 which is connected to the accumulator 44 via a check-valve 45 and connected to the reservoir 41 which stores an amount of hydraulic fluid. The fluid pump 43 is operated by a motor 42 which is actuated by an electric control signal from an electric control device (not shown) so as to keep the pressure at a set value.

To the tandem master cylinder 10, there is added an anti-skid or anti-lock device. That is to say, the first pressure chamber 12 is in fluid communication with the wheel cylinders 53a and 54a mounted on rear road wheels 53 and 54 respectively via the first circuit 71, a changeover valve 65, the third circuit 73, a changeover valve 63 and a changeover valve 64. Similarly, the second pressure chamber 16 is in fluid communication with the wheel cylinders 51a and 52a mounted on front road wheels 51 and 52 respectively via the second circuit 72, a changeover valve 65, a changeover valve 61 and a changeover valve 62. A port 20d which is formed on the housing 1b so as to be communicated with the boost chamber 20a is connected to a changeover valve 60 and the changeover valve 65 via a fourth circuit 74. The changeover valve 60 is communicated with a port 17a of the tandem master cylinder 10 via the fifth circuit 75.

The changeover valve 65 is a normally opened 3-port/2-position electromagnetic valve which is operated by a solenoid 65a. Normally, the valve 65 is held at a first position for establishing fluid communication between the first circuit 71 and the third circuit 73 and interrupting the fluid communication between the first circuit 71 and the fourth circuit 74. Upon actuation of the valve 65, the valve 65 is transfered from its first position to a second position so that the fluid communication between the first circuit 71 and the third circuit 73 is interrupted, and fluid communication between the first circuit 71 and the fourth circuit 74 is established. The transfer of valve 65 from the first position to the second position is performed by order of a control circuit 90 upon skid or locked condition.

The changeover valve 60 is a normally opened 2-port/2-position electromagnetic valve which is operated by a solenoid 60a and establishes fluid communication between the fourth circuit 74 and the fifth circuit 75. The valve 60 is closed by order of the control circuit 90 in response to a certain drop of the pressure in the power source 40 which is detected by a sensor 40a or in response to a certain shortage of brake fluid in the reservoir 41 which is detected by a sensor 41a. The valve 61 is a 3-port/3-position electromagnetic valve and operates in a first position to communicate the circuit 72 with the wheel cylinder 51a; in a second position to interrupt fluid communication between the circuit 72 and the wheel cylinder 51a; and in a third position to establish fluid communication between the circuit 72 and the reservoir 41. Normally, the valve 61 is held at its first position for performing the usual brake operation and is transfered to a proper position upon the occurrence of a skid condition for regulating the pressure of the brake fluid. The valve 62 is the same as the valve 61.

The valve 63 is a 3-port/3-position electromagnetic valve and operates in a first position to communicate the circuit 73 with the wheel cylinder 53a; in a second position to interrupt such fluid communication; and in a third position to establish fluid communication between the circuit 73 and the reservoir 41. Normally, the valve 63 is held at its first position for performing the usual brake operation and is transfered to a proper position upon the occurrence of a skid condition for regulating the pressure of the brake fluid. The valve 64 is same as the valve 61.

The above-described embodiment of the hydraulic braking system 1 operates as follows. In the condition illustrated in the figure, the brake pedal 2 is not depressed and no anti-skid or anti-lock operation is performed. Further, the pressure chamber 12 of the tandem master cylinder 10 is communicated with the wheel cylinders 53a and 54a of the wheels 53 and 54. Thus, the brake fluid filled in the wheel cylinders 51a and 52a is under a pressure equal to the pressure within the reservoir 41 which is substantially under atmospheric pressure. The wheel cylinders 51a and 52a are also under a pressure equal to the pressure within the reservoir 41 which is substantially below atmospheric pressure. On the other hand, the hydraulic power pressure of the power source 40 is supplied to the hole 27c of the hydraulic booster 20. Since the hole 27c is closed under this condition, the hydraulic booster 20 is not operated.

When the brake pedal 2 is depressed, the reaction piston 22 is pushed via the input rod 3. And, as the reaction piston 22 is moved until the reaction rod 22r abuts on the reaction disk 4a of the power piston 5, the control lever 25 is rotated in the counterclockwise direction by the pin 24a with respect to the support lever 24 so that the head of the control lever 25 pushes the spool 26. Thereby, the hydraulic power pressure from the power source 40 is introduced into the boost chamber 20a to push the power piston 5 and thereby apply the boost force to the first piston 11. Hence, the reaction force is transmitted to the brake pedal 2 via the reaction piston 22. In the boost chamber 20a, the hydraulic pressure is kept at the predetermined boost pressure by means of the spool valve 28 operated by the control lever 25 in response to relative displacement between the power piston 5 and the reaction piston 22.

Simultaneously, pressure delivered from the port 20d is transmitted to the wheel cylinders 51a and 52a via the second fluid chamber 17, the hole 15d, the hole 15e, the second pressure chamber 16 and the circuit 72. Also, due to the pressure introduced into the second fluid chamber 17, the second piston 15 is moved towards the first piston 11. Thus, the second piston 15 urges the valve member 14 onto the hole 11d for closing the latter and decreases the volume of the first pressure chamber 12 until the large-diameter land 15g abuts the stepped portion 10c of the bore 10a. Thereby, the circuit 71 and the wheel cylinders 53a and 54a, both of which are in fluid communication with the first pressure chamber 12, are initially filled with brake fluid. Thereafter, as soon as the first piston 11 is moved by the power piston 5, the pressure is applied to the wheel cylinders 53a and 54a. Thus, all motion of the first piston 11 constitutes a power stroke. Further, due to the initial filling of the brake fluid between the first pressure chamber 12 and the wheel cylinders 53a and 54a, no stroke of the pedal 2 is required to achieve such filling, so that the braking pressure is in linear proportion to the stroke of the pedal 2.

Next, under the anti-skid or anti-lock operation due to the detection of the skid or locked condition, the control circuit 90 actuates the valve 65, thereby supplying the pressure delivered from the hydraulic booster 20 directly to the wheel cylinders 51a, 52a, 53a, and 54a. In accordance with skid or locked condition on respective wheels 51, 52, 53, and 54, the pressure to be supplied to respective wheel cylinder 51a, 52a, 53a and 54a may be adjusted or regulated by actuating valves 61, 62, 63 and 64 to the appropriate respective position.

During this anti-skid or anti-lock operation, due to area difference between the large-diameter land 15g and the small-diameter lands 15h, 15d on the second piston 15 is urged towards the first piston by the fluid pressure and is in abutment with the stepped portion 10c of the bore 10a. Thus, the second piston 15 is, in effect, fluidly locked against movement toward the end wall 30. Consequently, the brake pedal 2 may not be moved towards the end wall 30b in spite of the pressure-decrease in the second pressure chamber 16 during anti-skid or anti-lock operation.

Also, in case no pressure is delivered from the hydraulic booster 20 due to disappearance of the pressure in the power source, for example, due to a fluid-leakage at the wheel cylinder 51a or 52a, the cooperation of the valves 60 and 65 may assure the creation of braking pressure and thus act as a fail-safe mechanism. In detail, in the former case, the valve 65 is brought out of operation during anti-skid or anti-lock operation. Thus, the braking operation is performed by only the tandem master cylinder 10. In the latter case, due to the decrease of the fluid in the reservoir 41 in response to the fluid leakage, the sensor 45 outputs a signal indicating the fluid leakage to the control circuit 90. Then, the control circuit 90 closes the valve 60. If this closure of the valve 60 is performed during anti-skid operation, the anti-skid operation is stopped or terminated and brings the valve 65 out of operation. Since sufficient braking pressure is reserved in the wheel cylinders 53a and 54a which are supplied from the first pressure chamber 12, the fluid-leakage at the side of the wheel cylinders 51a and 52a is interrupted by the valve 60 and the pressure delivered from the hydraulic booster 20 is interrupted by both valves 60 and 65, so that the fluid may not leak from the hydraulic booster 20. Thus, the function of the hydraulic booster 20 to be applied to the tandem master cylinder 10 may be maintained.

It is noted that a booster of the vacuum-operated type may be used instead of the hydraulic booster 20. In this case, it is required that a pressure regulating mechanism including a member corresponding to the spool valve 28, as a separation configuration to the booster of vacuum-operated type, has to be connected to the second fluid chamber 17.

While the invention has been particularly shown and described with reference to preferred embodiments thereof, it will be understood by those skilled in the art that the foregoing and other change in form and details can be made therein without departing from the spirit and the scope of the invention.

What is claimed is:

1. A hydraulic braking system comprising:
    a tandem master cylinder having:
    a bore with opposing open and closed ends,
    a brake pedal,
    a first piston slidably fitted in said bores so as to define a first pressure chamber and a first fluid chamber therein and operatively connected to said pedal through said open end,
    a second piston slidably fitted in said bore so as to define a second pressure chamber adjacent to said first pressure chamber, and a second fluid chamber operatively connected to said first piston and a land on said piston acted on by pressure in a direction away from said closed end;
    a first circuit through which fluid is supplied from said first pressure chamber to a first set of wheel cylinders, and
    a second circuit through which fluid is supplied from said second pressure chamber to a second set of wheel cylinders;
    a power source;
    a hydraulic booster for regulating the pressure derived from said power source in response to the depression of said pedal and for supplying the resulting pressure to said second fluid chamber;
    an anti-skid device for varying the pressure in said wheel cylinders during a skid condition; and
    means for fluidly locking said second piston against movement towards said closed end upon a reduction of the pressure in said second pressure chamber during operation of said anti-skid device includes said land arranged to be acted on by the pressure from said hydraulic booster.

2. A system according to claim 1, including an additional land disposed on said second piston, said second fluid chamber defined between said lands, said first-named land presenting a larger pressure area than said additional land.

3. A system according to claim 1, wherein said booster includes a booster housing defining a boost chamber communicating with said second fluid chamber, valve means for admitting pressure from said power source to said boost chamber, an input rod slidably disposed in said boost chamber and operably connected to said pedal for opening said valve in response to depression of said pedal, and a power piston arranged to be acted upon by pressure in said boost chamber to activate said first piston.

4. A system according to claim 3, including a fluid conduit interconnecting said boost chamber and said second fluid chamber, and a changeover valve disposed in said conduit.

5. A hydraulic braking system comprising:
    a tandem master cylinder having:
    a bore with opposing open and closed ends,
    a brake pedal,
    a first piston slidably fitted in said bores so as to define a first pressure chamber and a first fluid chamber therein and operatively connected to said pedal through said open end,
    a second piston slidably fitted in said bore so as to define a second pressure chamber adjacent to said first pressure chamber, and a second fluid chamber operatively connected to said first piston, a land on said second piston acted on by pressure in a direction away from said closed end, an additional land on said second piston, said second fluid chamber defined between said lands, said land having a larger pressure area than said additional land;
    a first circuit through which fluid is supplied from said first pressure chamber to a first set of wheel cylinders, and
    a second circuit through which fluid is supplied from said second pressure chamber to a second set of wheel cylinders;
    a power source;
    a hydraulic booster for regulating the pressure derived from said power source in response to the depression of said pedal and for supplying the resulting pressure to said second fluid chamber;
    an anti-skid device for varying the pressure in said wheel cylinders during a skid condition; and
    means for fluidly locking said second piston against movement towards said closed end upon a reduction of the pressure in said second pressure chamber during operation of said anti-skid device includes said land arranged to be acted on by the pressure from said hydraulic booster.

* * * * *